Figure 1:
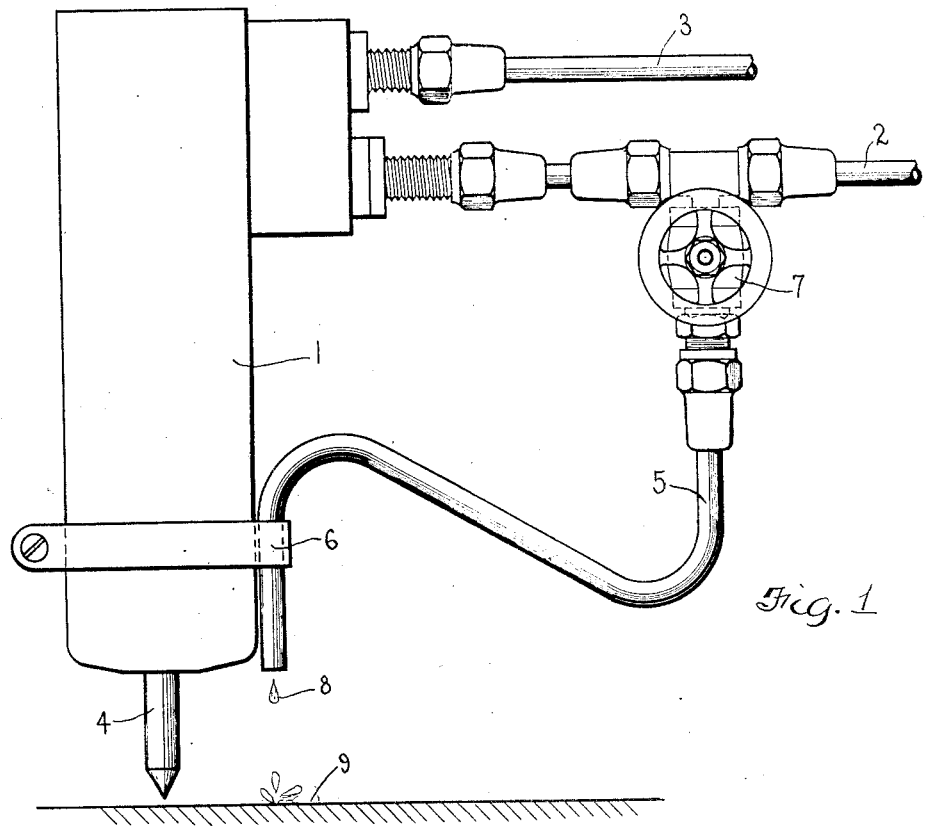

May 15, 1934.  W. E. STINE  1,958,649

ARC WELDING

Filed June 17, 1930

INVENTOR.
Wilmer E. Stine
BY
Fay Oberlin & Fay
ATTORNEYS.

Patented May 15, 1934

1,958,649

UNITED STATES PATENT OFFICE 1,958,649

ARC WELDING

Wilmer E. Stine, Cleveland, Ohio, assignor to The Lincoln Electric Company, Cleveland, Ohio, a corporation of Ohio Application June 17, 1930, Serial No. 461,737

3 Claims. (Cl. 219—10)

This invention, relating as indicated to arc welding, has specific reference to a method of welding whereby the structure of the resultant weld will be more homogeneous and, consequently, of increased quality and strength over the results obtained by any methods of welding heretofore employed.

The method comprising my invention is applicable to all forms of welding wherein the elements to be joined are united by the formation of a pool of molten metal which, upon solidification, unites the articles sought to be joined. One chief difficulty in the formation of a homogeneous weld structure by the methods heretofore employed, resides in the formation of gas pockets or blow holes in the metal forming the weld upon solidification, which gas pockets detract from the quality and strength of the finished weld. I have discovered that by the introduction of a vapor, such as water vapor or steam, in the form of a blanket over the pool of molten metal, or into the atmosphere surrounding the arc or flame, the formation of gas pockets in the fused or molten metal, as it cools and solidifies, is eliminated or greatly reduced.

As a specific illustration of the effectiveness of the method comprising my invention in producing a weld of superior quality, a steel containing .24 per cent. carbon and .14 per cent. silicon was found to be capable of being satisfactorily welded if water vapor was introduced into the atmosphere around the molten pool, but when such vapor was omitted the resultant weld was porous and full of gas pockets or blow holes resulting in a very unsastisfactory seam.

My invention is specifically applicable to electric arc welding in that the vapor or fluid employed for the purpose of eliminating the formation of gas pockets in the metal as it solidifies, may at the same time be employed advantageously for the purpose of stabilizing and controlling the electric arc.

As is well known by those familiar with the art of arc welding, if the welding arc is permitted to play upon the material to be welded, such arc is inclined to be erratic in its behavior and means must be provided for stabilizing and controlling the arc so that a proper welded seam will result. By the method comprising my invention I propose to utilize the fluid which is introduced to the arc area for the purpose of eliminating the formation of gas pockets in the metal as a means for controlling the arc in the manner hereinafter more specifically explained.

To the accomplishment of the foregoing and related ends, said invention, then, consists of the means hereinafter fully described and particularly pointed out in the claims, the annexed drawing and the following description setting forth in detail one approved method of carrying out in the invention, such disclosed mode, however, constituting but one of the various ways in which the principle of the invention may be used.

Figure 2:
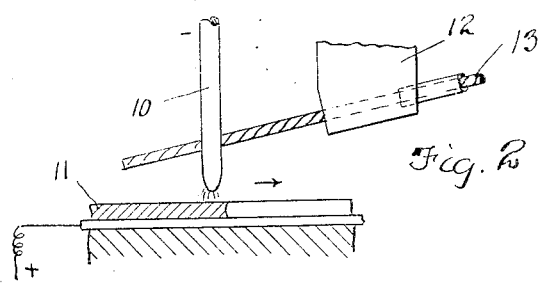

In said annexed drawing:

Fig. 1 is a fragmentary side elevational view of one form of mechanism whereby the principles comprising my invention may be accomplished; and Fig. 2 shows an alternative form of construction by means of which the water vapor or fluid may be introduced to the arc area.

Referring more specifically to the drawing and more especially to Fig. 1, the welding electrode holder in the specific form illustrated in this figure consists of a body 1 having fluid conduits therein for the purpose of cooling such holder, which fluid conduits are terminally connected to the supply in the exhaust conduits 2 and 3, the welding electrode 4 which may be carbon or metallic, depending upon the particular class of work to be welded, is supported in the holder 1 in any manner of the accepted methods of which electrodes are usually supported. The fluid conduit 2 has associated therewith an auxiliary conduit 5 which may be supported by a bracket as at 6 on the bottom of the electrode holder 1. A valve 7 may be provided for the purpose of regulating the flow of water or fluid from the conduit 2 to the conduit 6 from which it is discharged as at 8 and permitted to drop onto the surface 9 of the seam which has just been welded by the electrode 4. The residual welding heat present in the seam 9 will immediately vaporize the fluid and such vapor will then serve as an effective blanket over the pool of molten metal immediately under the welding electrode 4.

As is well known in the art of electric welding, the quality of the resultant weld may be increased by introducing to the welding arc or flame material which will burn and consequently consume oxygen so that oxidation of the molten metal will be prevented to form a more homogeneous weld structure. One of the ways in which the above result has been accomplished has been to introduce to the arc area a rope or cord which will burn in the heat of the arc and consume the oxygen which would otherwise effect an oxidation of the molten metal.

In Fig. 2 I have diagrammatically illustrated a welding electrode 10 in arcing relation to the work 11. A bracket 12 is positioned adjacent the welding electrode for the purpose of leading to the arc area a combustible string or rope 13 which, when introduced to such arc or flame will burn to consume the oxygen in the atmosphere surrounding such arc in the manner hereinbefore explained. The water or vapor may be introduced to the arc area by soaking such string or rope 13 in water or other liquid before introducing the same to the arc so that under the influence of the arc heat, such water will be driven off in the form of a vapor permeating the atmosphere around such arc and effecting the vapor blanket for the purposes hereinbefore explained.

In a number of instances, in order to effect a homogeneous seam, materials are introduced to the arc which are commonly termed as fluxes, which fluxes have a variety of uses depending upon the particular character of work to be welded. Among the uses of such flux as is well known to those familiar with the art of electric welding, is to provide a slag which floats on the molten metal, thereby producing a superior weld. Regardless, however, of the use to which such flux is put, such flux or added material may also be employed for the purpose of producing a blanket of water vapor around the arc or flame and/or over the pool of molten metal. By employing fluxes which have a relatively high water of crystallization content, such water of crystallization will be liberated as the flux is burned or otherwise decomposed in the arc which liberated water of crystallization effects or produces the above described blanket of water vapor around the arc and over the pool of molten metal.

As an example of some materials which may be employed as so-called fluxes, are sodium borate which has the formula $Na_2B_4O_7.10H_2O$, sodium carbonate $Na_2CO_3.10H_2O$, sodium phosphate $Na_3PO_4.12H_2O$, sodium acetate, boric acid, etc. Some of the above named materials and some of the above named compounds or similar compounds may have as indicated relatively high water of crystallization content which water is liberated under the action of the arc heat. Other materials such as boric acid which when decomposed by the heat of the arc form water as one of the resultants of such decomposition may also be employed for the purpose of producing the sought after vapor blanket.

The manner in which the above so-called fluxes or like materials may be introduced to the arc area vary according to the particular type of work to be welded. One manner in which the above named materials or so-called fluxes may be introduced to the arc area is to impregnate the above described rope or cord 13 with such material or fluxes so that when such rope burns in the arc area the materials will be properly decomposed, liberating the water for producing the vapor blanket.

The vapor not only serves as a blanket for the pool of molten metal in the arc area, but also will permeate the atmosphere through which the welding arc passes. By the introduction of water vapor to the atmosphere through which the arc passes, the resistance of such arc may be controlled and varied according to the action of such vapor present and, accordingly the welding operation may be carried on with greater precision.

When the apparatus employed to introduce the water to the arc is of the type illustrated in Fig. 1, or is similar thereto, the fluid so introduced may be mixed with compounds of an alkaline base element such as compounds of sodium, potassium calcium, borax borium, etc. When such compounds are employed in connection with the water introduced in the arc, such compounds may be utilized to further prevent the formation of gas pockets in the metal as it solidifies and also assists in stabilizing or varying the resistance of the arc. The same condition is true when the water is introduced to the arc area by being present in one form or another in the rope 13 along with compounds of the above named elements. A further advantage incidental to the employment of the above named chemical compounds in connection with the vapor introduced to the arc area is that such materials will sustain the arc as it is struck between the welding electrode and work so that a more uniform arc will result which, in turn, aids in producing a weld having a homogeneous structure.

The method comprising my invention is particularly applicable, as illustrated, to the carbon arc process of welding wherein a portion of the carbon electrode becomes heated to the point of incandescence. The water vapor coming in contact with the higher heated carbon combines therewith in the well known reaction $C+H_2O = CO+H_2$ forming water gas, thereby producing a strong reducing atmosphere which effectively shields the arc and protects or blankets the molten metal.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In metal working by electricity, the steps which consist in establishing an arc between the work and a carbon electrode, and supplying water to the arc area whereby such water combines with the heated carbon of the electrode to form a reducing atmosphere of water gas around the arc and over the pool of molten metal.

2. In metal working by electricity, the steps which consist in establishing an arc between the work and a carbon electrode, and supplying water vapor to the arc area whereby such water vapor combines with the heated carbon of the electrode to form a reducing atmosphere of water gas around the arc and over the pool of molten metal.

3. In metal working by electricity, the steps which consist in establishing an arc between the work and a carbon electrode, and supplying steam to the arc area whereby such steam combines with the heated carbon of the electrode to form a reducing atmosphere of water gas around the arc and over the pool of molten metal.

WILMER E. STINE.